United States Patent Office 3,076,025
Patented Jan. 29, 1963

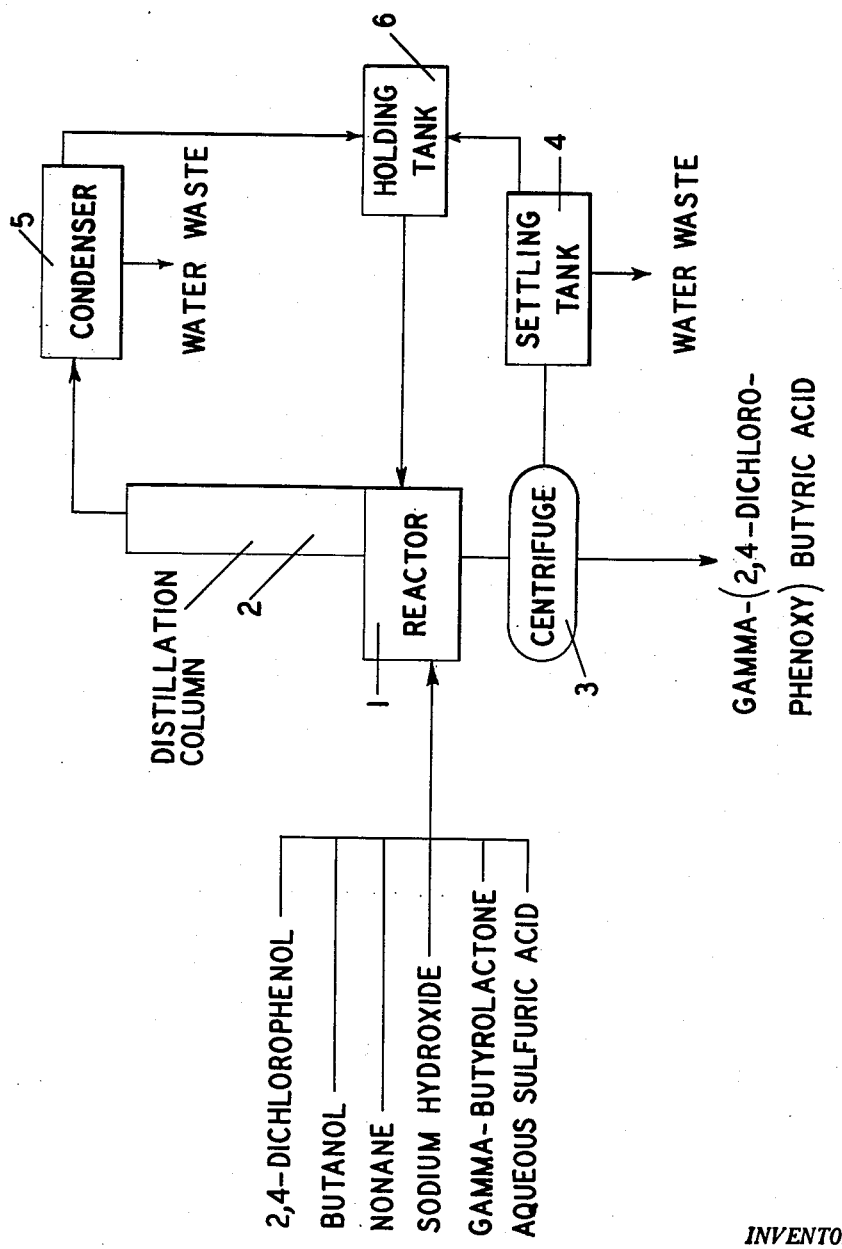

3,076,025
PROCESS FOR THE PRODUCTION OF SUBSTI-
TUTED PHENOXYALKANOIC ACID
John N. Hogsett, Charleston, W. Va., assignor to Union
Carbide Corporation, a corporation of New York
Filed Nov. 30, 1959, Ser. No. 856,264
4 Claims. (Cl. 260—521)

This invention relates to an improved process for the production of substituted phenoxyalkanoic acids. More particularly, the present invention relates to a process for producing substituted phenoxyalkanoic acids from the corresponding substituted phenols and lactones. The invention is particularly applicable to the production of gamma-(2,4-dichlorophenoxy)butyric acid.

Substituted phenoxyalkanoic acids have been prepared by reacting the sodium derivative of a substituted phenol with a chloronitrile, followed by hydrolysis of the resulting substituted nitrile to the corresponding acid. However, this method has not been found to be completely satisfactory. The process is comparatively cumbersome and expensive, requiring a starting material which is difficult to prepare and involving a number of separate operations. In addition, the process provides relatively low yields of the desired substituted phenoxyalkanoic acids.

It has also been known that substituted phenoxyalkanoic acids can be prepared by an aqueous process comprising reacting a substituted phenol with an alkali metal hydroxide, thereafter reacting the resulting alkali metal phenolate with a lactone to produce an alkali metal salt of a substituted phenoxyalkanoic acid and thereafter acidifying the alkali metal salt with a mineral acid to produce the desired substituted phenoxyalkanoic acid. This general process, however, is not satisfactory for large scale commercial use because of the long reaction periods which are required, the relatively low yields which are obtained and the hazards which are involved in handling solid alkali metal phenolates.

The present invention is an improvement over the above-mentioned process.

We have discovered that a greatly improved process results when the above-described process is carried out in the presence of a solvent comprising a lower alcohol and a hydrocarbon and recycling the solvent to the reactor after removal of the product. The present process is more efficient, much simpler and much less hazardous than the above-mentioned method and results in much higher yields than have heretofore been obtainable in the production of substituted phenoxyalkanoic acids. Furthermore, acids substantially free of impurities such as phenols are obtained.

Substituted phenols which may be utilized in the process of the present invention may be represented by the following formula:

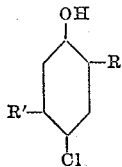

wherein R and R' are members selected from the group consisting of H, Cl and $CH_3$. Illustrative of such phenols are: 2,4-dichlorophenol, 3,4-dichlorophenol, 2,4,5-trichlorophenol, 2-methyl-4-chlorophenol and 3-methyl-4-chlorophenol.

Lactones which may be employed may be represented by the following formula:

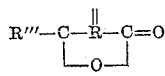

wherein $\overset{\text{O}}{\underset{}{\text{R}}}$ is a $C_1$–$C_4$ alkylene group and R''' is a member selected from the class consisting of hydrogen and lower alkyl. Illustrative of such lactones are beta-propiolactone, gamma-butyrolactone, delta-valerolactone, epsilon-caprolactone, and epsilon-methylcaprolactone.

The first step in the process of the present invention comprises reacting the substituted phenol with from about 0.5 to about 2.0 mols, per mol of phenol, of a source of alkali metal ions, preferably sodium hydroxide. Other sources of alkali metal ions which may be employed include lithium, potassium, cesium and rubidium hydroxides and the sodium, lithium, potassium, cesium and rubidium alcoholates of lower alcohols (e.g., methanol, ethanol, 2-propanol, 1-butanol and 3-heptanol).

The reaction may be conducted at a temperature of from about 50° C. to about 200° C. for a period of from about 0.5 to about 24 hours.

The reaction may be conducted in the presence of water, but water should preferably be absent during the reaction.

It is an essential feature of the present invention that the reaction be conducted in the presence of from about 1.0 to about 9.0 parts by weight, based on the phenol, of a solvent comprising an alcohol and a hydrocarbon.

Suitable alcohols may contain from 1 to 10 carbon atoms and include methanol, ethanol, propanol, butanol, hexanol, 2-ethylhexanol, and decanols. The preferred lower alcohol employed for a particular reaction depends on the particular phenolic reactant which is used and on the particular temperature and pressure which are employed during the reaction. We have found that butanol is the preferred alcohol, when the process of our invention is employed for the production of gamma(2,4-dichlorophenoxy)butyric acid; when butanol is employed greater yields of the final product are obtained.

Suitable hydrocarbons for use in the process of this invention may contain from about 5 to about 14 carbon atoms and should preferably form a constant-boiling mixture with the alcohol employed. Applicable hydrocarbons include pentane, hexane, heptane, nonane, benzene, petroleum ether, heavy blending naphthas, and other hydrocarbon mixtures. Especially desired is "nonane," a commercially available mixture of hydrocarbons having from 7 to 10 carbon atoms.

The preferred solvent mixture is a mixture of butanol and nonane, although other mixtures such as a mixture of hexanol and a heavy blending naphtha (containing $C_{10}$–$C_{14}$ hydrocarbons) may be used.

The alcohol-hydrocarbon mixtures may have a volume ratio of alcohol to hydrocarbon of from about 10:1 to about 1:10 although ratios of from about 1:2 to about 1:1 are preferred.

The second step of the overall process comprises reacting the alkaline metal phenoxide produced in the first step with a lactone to produce the alkali metal salt of a phenoxyalkanoic acid.

This reaction can be conducted at temperatures of from about 135° C. to about 210° C. When gamma-(2,4-dichlorophenoxy)butyric acid is prepared the reaction is preferably conducted at a temperature of from about 160° C. to about 165° C. for a period of from about 1 to about 24 hours.

The lactone should be present in a mol ratio of from about 0.5:1 to about 2:1, based on the phenol.

Preferably, any water present during the first step of the present process should be removed by distillation prior to the second step. A portion of the alcohol-hydrocarbon mixture may also be distilled off at this time and recycled to the reactor.

The third step of the process comprises neutralizing the alkali metal salt of the phenoxyalkanoic acid produced in the second step with a mineral acid. Suitable mineral acids include sulfuric acid, hydrochloric acid and phosphoric acid.

The final product can be recovered by centrifugation, filtration or other means for liquid-solid separation. The effluent from the solids-liquid separation may be introduced to a settling tank or other quiescent zone where two layers, a water layer and an organic layer separate out. The water layer, containing water soluble salts such as $Na_2SO_4$ and the like formed by the reaction, is drawn off and discarded. The organic layer, containing substantially all of the unreacted phenol and lactone in addition to the alcohol-hydrocarbon solvent, is recycled to the reactor.

If it is desired, traces of unreacted phenol remaining in the product may be removed by any of several well known means such as by steam distillation or by solvent extraction with suitable solvents, such as petroleum ether, hexane, heptane or nonane. The final product may then be dried under reduced pressure. It can be further purified by slurrying in petroleum ether, diethyl ether, nonane or other hydrocarbon solvent, centrifuging or filtering the resulting slurry, and drying the precipitate thus produced. Such purification is generally not necessary, however, since the product is substantially free of impurities.

The drawing is a flow diagram illustrating a preferred embodiment of this invention. This drawing is purely illustrative and is not to be considered as limiting this invention in any manner since obvious modifications and refinements will occur to those skilled in the art.

Referring to the drawing, 2,4-dichlorophenol, butanol, nonane and flaked sodium hydroxide are charged to an agitated reactor 1 having a means for heating and cooling the reaction mixture and fitted with a distillation column 2. The reaction mixture is heated at reflux temperatures for a period of about 0.5 hour to about 2.0 hours. The distillate is removed overhead from the distillation column 2 and conducted to a condenser 5, where it is condensed and two liquid layers are formed; one being a water layer and the other an organic layer. The water layer is discarded while the organic layer, predominantly butanol and nonane, is recycled to the reactor 1 via the holding tank 6. After the initial reflux period, gamma-butyrolactone is added to the reactor and the mixture is refluxed for a period of from about 1 hour to about 6 hours. The system is then cooled to about 100 degrees centigrade and the reaction mixture is acidified with aqueous sulfuric acid. The mixture is further cooled to about 15 degrees centigrade and discharged from the reactor 1 and the solid product is removed in a centrifuge 3. The product is removed from the centrifuge 3 and dried. The effluent liquid from the centrifuge 3 is passed to a settling tank 4 where two liquid layers are formed. The water layer containing sodium sulfate and other water soluble products is drawn off and discarded. The organic layer containing solvent and unreacted 2,4-dichlorophenol and gamma-butyrolactone is drawn off to the holding tank 6 and mixed with the organic layer from the condenser 5. The organic liquid from the holding tank 6 is recharged to the reactor 1, 2,4-dichlorophenol and sodium hydroxide are added and the process is repeated.

The following examples are also cited to demonstrate the operation of this invention and are not intended to limit the scope of this invention in any manner.

*Example 1*

Into a 1-liter, 3-necked flask equipped with a thermometer, an agitator, a condenser and a feed tank were charged 50 grams of 2,4-dichlorophenol, 14 grams sodium hydroxide and 100 ml. of butanol. The system was agitated and heated at reflux temperature for a period of one hour. The water that formed was removed as the lower layer of the overhead condensate. Butanol (75 ml.) was distilled off at a kettle temperature of 135° C. About 200 ml. of nonane, containing 29.5 grams (10 percent by weight excess) of gamma-butyrolactone was fed, dropwise, to the reaction mixture over a period of 15 minutes. A constant boiling mixture of 25 ml. of butanol and nonane was distilled off at a kettle temperature of 140° C. to 145° C. and the system was maintained at reflux for a period of 3 hours. The system was cooled to 70° C. and 300 ml. of 7.5 percent by weight aqueous sulfuric acid was fed dropwise to the mixture, over a period of 15 minutes. The reaction mixture was cooled to 5° C. with agitation and filtered. The filter cake was air dried. The yield was 62.7 percent, as 100 percent gamma-(2,4-dichlorophenoxy)butyric acid containing no 2,4-dichlorophenol. The filtrate was separated and the nonane layer was distilled to yield 17.9 grams of 2,4-dichlorophenol and 2.5 grams of gamma-(2,4-dichlorophenoxy)butyric acid. The overall efficiency of the process was 93.2 percent on the basis of the 2,4-dichlorophenol charged, reacted and recovered.

*Example 2*

Into a 2-liter, 3-necked jacketed reactor equipped with a thermometer, agitator, condenser and feed tank were charged 200 grams of 2,4-dichlorophenol (1.23 moles), 200 ml. of butanol, 300 ml. of nonane and 50 grams of flaked sodium hydroxide. The system was agitated and was heated at reflux temperature for a period of one hour. The water that was formed was removed as the lower layer of the overhead condensate. Three hundred ml. of a constant boiling mixture of butanol and nonane was distilled to a kettle temperature of 150° C. and was transferred to a holding tank for recycle. Then 70 grams of gamma-butyrolactone (0.81 mole) were fed to the reactor over a period of 15 minutes. The reaction mixture was allowed to reflux for a period of 3 hours at a kettle temperature of from 150 to 155° C. The system was cooled to 70° C. and 450 ml. of 14 percent aqueous sulfuric acid was fed to the mixture over a period of 15 minutes. The reaction mixture was cooled to 15° C. by application of cold water to the jacket of the reactor and the reaction mixture was filtered by feeding the slurry to a perforated-bowl centrifuge. The discharge from the centrifuge was transferred to a 1-liter separatory funnel and the lower or water layer was discarded. The upper or organic layer containing butanol, nonane, and unreacted 2,4-dichlorophenol, and gamma-butyrolactone was recycled to the reactor for the next reaction phase. The filter cake was air dried to obtain 178.5 grams of gamma-(2,4-dichlorophenoxy)butyric acid and 0.6 percent 2,4-dichlorophenol. The yield of product was 91.5 percent based on the gamma-butyrolactone.

The constant boiling mixture layer of 300 ml. of nonane and butanol from the first phase reaction was recycled to the reactor and additional 2,4-dichlorophenol (106 grams or 0.65 mole) along with 50 grams of flaked sodium hydroxide were added to the reactor. The reaction was conducted as described for the first-pass reaction except that only 65 grams of gamma-butyrolactone (0.75 mole) were added to the reaction mixture. A wet product of 191 grams was obtained, which analyzed as 91.6 percent of 2,4-dichlorophenoxybutyric acid and 0.3 percent 2,4-dichlorophenol. The yield of product based on gamma-butyrolactone was 91.6 percent. The operation was continued as described above for a series of five recycle passes through the process and the final organic layer from the centrifuge discharge was distilled to obtain 107.5 grams of 2,4-dichlorophenol and 10.7 grams of gamma-butyrolactone. During the over-all process operation 632.0 grams of 2,4-dichlorophenol were charged to the reactor. The products that were obtained represented 517.1 grams of the charged 2,4-dichlorophenol and 107.5 grams of the 2,4-dichlorophenol were recovered by distillation at the end of the process operation; therefore, the over-all efficiency based on 2,4-dichlorophenol was 98.9 percent, the over-all yield, of gamma-(2,4-dichlorophenoxy)butyric acid being about 82 percent, based on the charged 2,4-dichlorophenol.

This application is a continuation-in-part of Serial No. 738,605, filed May 29, 1958 and now abandoned.

What is claimed is:

1. In the process for producing a substituted phenoxyalkanoic acid comprising reacting a substituted phenol with an alkali metal hydroxide to form an alkali metal phenolate, reacting said phenolate with a lactone, and acidifying the reaction mixture to produce said substituted phenoxyalkanoic acid, the improvement of conducting said process in the presence of from about 1 to about 9 parts by weight, based upon the weight of said phenol, of a reaction solvent comprising an aliphatic alcohol having from 1 to 10 carbon atoms and a hydrocarbon having from 5 to 14 carbon atoms, the volumetric ratio of said alcohol to said hydrocarbon being from 1:10 to 10:1, whereby said phenoxyalkanoic acid is produced substantially free of said phenol.

2. In the process for producing a substituted phenoxyalkanoic acid comprising reacting a substituted phenol with an alkali metal hydroxide to form an alkali metal phenolate, reacting said phenolate with a lactone, and acidifying the reaction mixture to produce said substituted phenoxyalkanoic acid, the improvement of conducting said process in the presence of from about 1 to about 9 parts by weight, based upon the weight of said phenol, of a reaction solvent comprising an aliphatic alcohol having from 1 to 6 carbon atoms and a hydrocarbon having from 7 to 10 carbon atoms, the volumetric ratio of said alcohol to said hydrocarbon being from 1:2 to 1:1, whereby said phenoxyalkanoic acid is produced substantially free of said phenol.

3. In the process for producing a substituted phenoxyalkanoic acid comprising reacting a substituted phenol with an alkali metal hydroxide to form an alkali metal phenolate, reacting said phenolate with a lactone, and acidifying the reaction mixture to produce said substituted phenoxyalkanoic acid, the improvement of conducting said process in the presence of from about 1 to about 9 parts by weight, based upon the weight of said phenol, of a reaction solvent comprising butanol and a hydrocarbon having from 7 to 10 carbon atoms, the volumetric ratio of said butanol to said hydrocarbon being from 1:2 to 1:1 whereby said phenoxyalkanoic acid is produced substantially free of said phenol.

4. In the process for producing gamma-(2,4-dichlorophenoxy)butyric acid comprising reacting 2,4-dichlorophenol with an alkali metal hydroxide to form an alkali metal phenolate, reacting said phenolate with gamma-butyrolactone, and acidifying the reaction mixture to produce said gamma-(2,4-dichlorophenoxy)butyric acid, the improvement of conducting said process in the presence of from about 1 to about 9 parts by weight, based upon the weight of said phenol, of a reaction solvent comprising butanol and a hydrocarbon having from 7 to 10 carbon atoms, the volumetric ratio of said butanol to said hydrocarbon being from 1:2 to 1:1, whereby said phenoxyalkanoic acid is produced substantially free of said phenol.

References Cited in the file of this patent

UNITED STATES PATENTS

| 2,866,816 | Heywood | Dec. 30, 1958 |
| 2,952,702 | Galat | Sept. 13, 1960 |

FOREIGN PATENTS

| 793,514 | Great Britain | Apr. 16, 1958 |